United States Patent Office 3,149,521
Patented Sept. 22, 1964

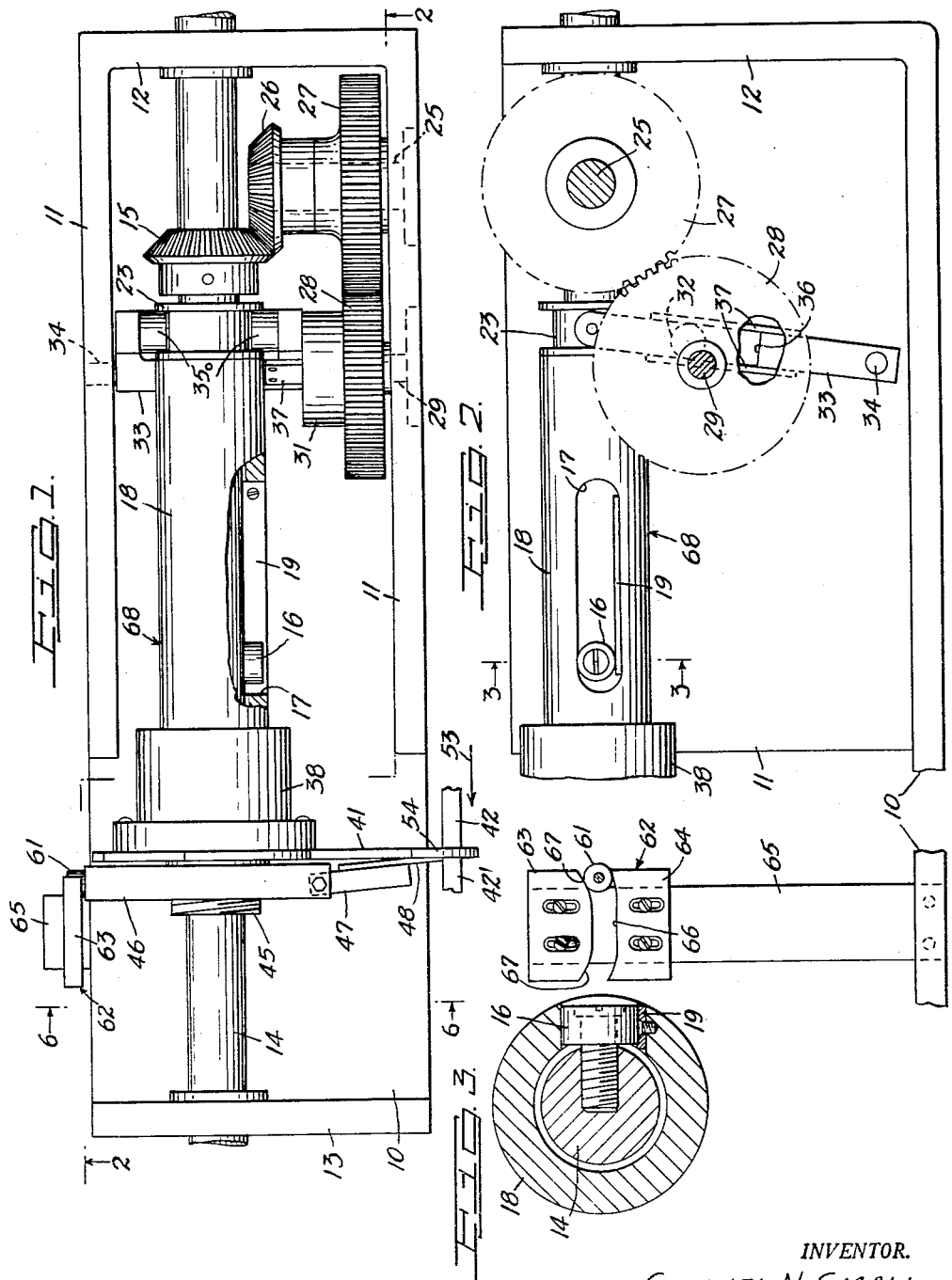

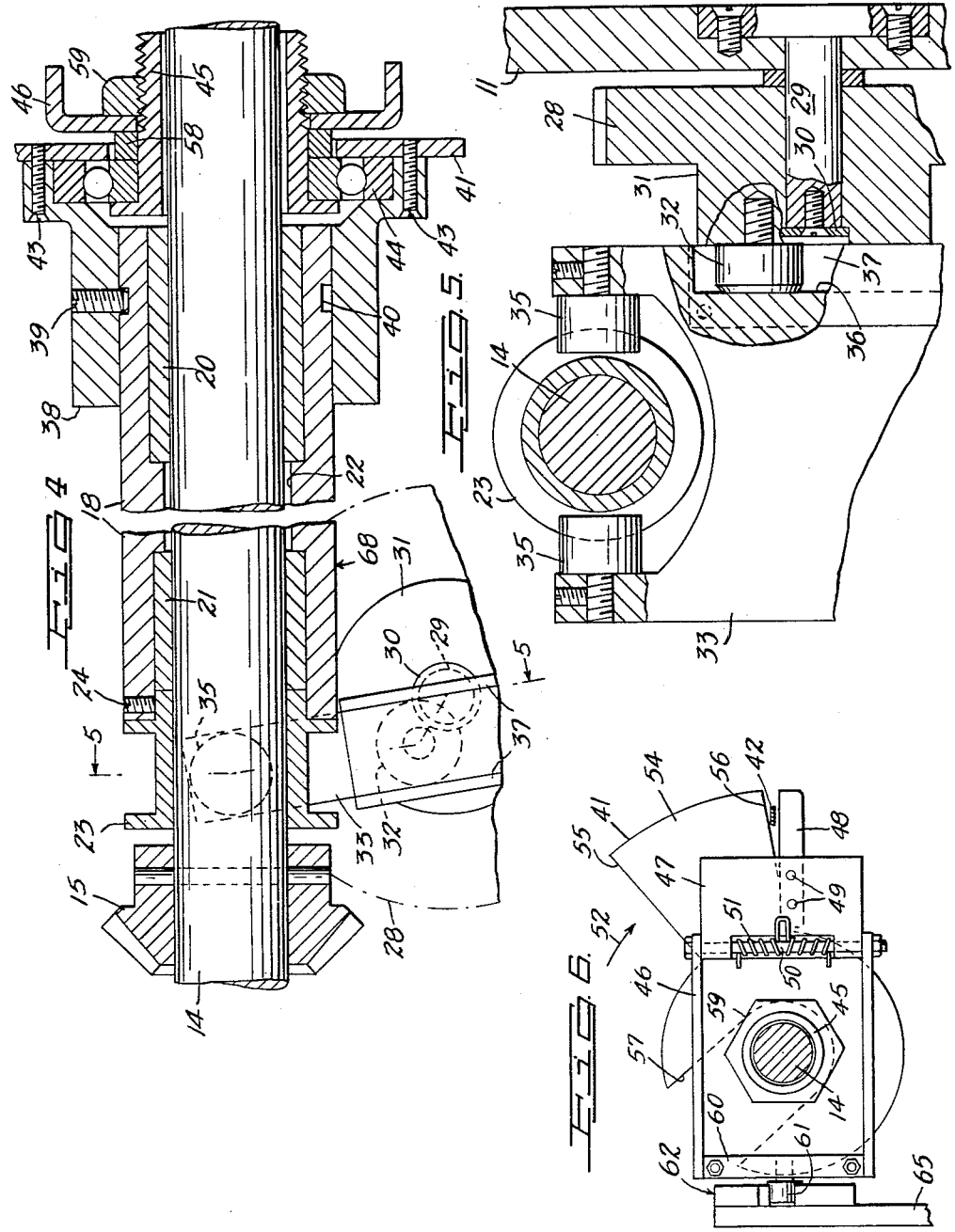

3,149,521
APPARATUS FOR SHEARING ELONGATED WORKPIECES DURING FEED OF SAID WORKPIECES
Samuel N. Small, Valley Stream, N.Y., assignor to Julius Duberstein, New York, N.Y.
Filed Mar. 23, 1960, Ser. No. 17,169
5 Claims. (Cl. 83—320)

This invention relates to a method and apparatus for moving a tool shearing or other means longitudinally with and in synchronism with a workpiece fed into the apparatus and without interrupting the normal feed of the workpiece.

More particularly, the invention deals with an apparatus employing shearing means reciprocated back and forth in the apparatus and, wherein, the rotary cutter of the shearing means serves to advance the severed portion of the workpiece; whereupon, the reverse movement of the shearing means automatically reaches the next successive station of the fed workpiece in shearing the same in the next successive interval.

Still more particularly, the invention deals in an apparatus of the character described, wherein the stationary cutter of the shearing means includes means for positioning said cutter out of the path of movement of the workpiece during part of the cycle of operation of the apparatus.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic plan view of an apparatus made according to my invention, with parts of the construction broken away and in section.

FIGG. 2 is a section generally on the irregular line 2—2 of FIG. 1, with parts of the construction broken away and diagrammatically illustrating part of the gear drive.

FIG. 3 is an enlarged section on the line 3—3 of FIG. 2, omitting all background showing.

FIG. 4 is an enlarged sectional view through the main drive of the apparatus, parts of the construction being broken away and omitting all background showing.

FIG. 5 is a partial section on the broken line 5—5 of FIG. 4, with parts broken away and in section; and FIG. 6 is a section substantially on the line 6—6 of FIG. 1, showing primarily the cutter or shearing mechanism of the apparatus.

Considering FIGS. 1 and 2 of the drawing, my apparatus employs a more or less open casing, defined by a bottom wall 10, side walls 11 integral with one end wall 12 but terminating short of the other end wall 13, as will clearly appear from a consideration of FIG. 1. Mounted in suitable bearings in the end walls 12 and 13 is a main drive shaft 14, to which is fixed a bevelled gear 15 and a drive roller 16. The roller 16 operates in an elongated aperture 17 in a rotary and reciprocating tubular shaft 18, the aperture 17 having fixed to one wall thereof a wear plate 19; note, in this connection, FIG. 3 of the drawing.

Supported in end portions of the tubular shaft 18 are plain bearings 20, 21 and the bore 22 of the shaft intermediate said bearings, is of greater diameter than the shaft 14, thus minimizing frictional engagement. Fixed to one end of the tubular shaft 18 is a grooved drive collar 23, fixed to the shaft as by a set screw 24, note FIG. 4 of the drawing.

Rotatably mounted on a shaft 25 having a suitable support in one side wall 11 is a bevelled gear 26 meshing with the gear 15 and another gear 27 meshing with a gear 28 on another shaft 29 supported in the same side wall of the casing. The gear 28 is supported on the shaft 29 by a retaining plate, indicated, in part, at 30 in FIG. 5 of the drawing. The inner surface of the gear 28 includes a crank portion 31, to which is fixed an eccentrically supported crank roller 32, as clearly illustrated in the broken section FIG. 5 of the drawing. At 33 I have shown an oscillating arm, pivoted, as seen at 34, on at least one side wall 11 of the casing, the upper end of the arm being yoke-shaped in form, as clearly illustrated in FIG. 5, and the terminal ends of the yoke supporting rollers 35 which operate in the groove of the grooved drive collar 23, again, as clearly noted in FIG. 5 of the drawing.

One side of the arm 33 is cut out to form an elongated aperture 36, in which the crank roller 32 operates, the roller being retained in the aperture by side bearing plates 37, one plate 37 being indicated, in part, in FIG. 5 of the drawing and the two plates being diagrammatically illustrated in FIGS. 2 and 4 of the drawing.

From the foregoing description, it will be apparent that, in the operation of the drive shaft 14, the tubular shaft 18 is rotated through the medium of the roller and the shaft is reciprocated back and forth through action of the arm 33, the latter being reciprocated through the medium of the crank roller 32.

Considering FIG. 4 of the drawing, a knife supporting sleeve 38 is adjustably fixed to the tubular shaft 18 by a set screw 39 operating in an annular groove 40, this adjustment being to control and regulate positioning of the rotary knife or blade 41 supported by the sleeve, particularly in regulating the period of shearing the workpiece shown, in part, at 42 in FIG. 1 of the drawing. The knife 41 is fixed to the sleeve, as by screws 43, the sleeve 38 having an enlarged portion supporting a bearing 44 to provide free rotation of the knife 41. Supported within the bearing 44 is an externally threaded sleeve 45, upon which is clamped a knife supporting channel frame 46.

Pivoted in one end portion of the frame 46, note FIG. 6 of the drawing, is a plate 47, to which what I will term the stationary knife or cutter 48 is supported, as indicated diagrammatically at 49. Arranged upon the pivot pin 50 of the plate and engaging the plate and the frame 46 is a spring 51 for normally urging the knife 48 upon the adjacent surface of the rotary knife 41 to insure positive shearing of the workpiece 42 in forming the sheared end product, as at 42′, indicated, in part, in FIG. 1 of the drawing.

In FIG. 6 of the drawing, the parts are shown in a position preparatory to shearing the workpiece 42, the knife 41 rotating in the direction of the arrow 52 of FIG. 6, it being understood that the workpiece 42 is fed by means, not shown, in the direction of the arrow 53 of FIG. 1 of the drawing. At this time, it is well to point out that the reciprocating movement of what might be termed the knife or tool actuating unit to the left, or in the direction of the arrow 53, will be set in synchronism to the feed of the workpiece 42 in the direction of the arrow 53; whereas, this feed continues after the shearing operation has been performed. Keeping in mind that this action takes place after the shearing operation has been performed, the knife 41 includes an enlarged sheared product pusher portion 54, clearly seen in FIG. 6 of the drawing, which is of sufficient circumferential dimensions as to fully advance the sheared product to a delivery station, which would be adjacent the end wall 13; whereupon, the edge 55 of the pusher 54 in the rotary movement of the knife 41 will have cleared the path of movement of the feed of the workpiece 42, thereby not interfering with the continued feed of such workpiece so that, when the cutter edge 56 of the knife 41 is again in position to shear the workpiece 42, a predetermined measured length of the end product will have been fed past the station then assumed by the knife 41, this station being substantially at the limit of movement of the unit referred to the right, as viewed in FIG. 1 of the drawing.

Considering FIG. 6 of the drawing, it will appear that, by removing the screws 43, the knife 41 may be removed at will for sharpening or other purposes, an aperture 57 being provided in the hub portion of the knife to facilitate free passage over the bearing supports on the shaft 14. This will also appear from a consideration of FIG. 4 of the drawing and, in said figure, I have shown at 58 a spacing washer between the bearing 44 and the frame 46, the nut securing the same in position being indicated at 59, the nut engaging the threaded portion of the sleeve 45, as clearly illustrated in FIG. 4.

Mounted in a suitable bearing strip 60 fixed to the opposed end of the frame 46, as seen in FIG. 6, is a roller 61 operating in conjunction with a slide 62 comprising an upper plate 63 and a lower plate 64, both plates being vertically adjustable on an upstanding support 65 at one side of the frame, as clearly illustrated in FIG. 2 of the drawing. Adjacent surfaces of the plates 63, 64 form the channel 66 of the slide 62 and end portions of the channel turn upwardly, as indicated at 67, and with the roller 61 in this position, as noted in FIG. 2 of the drawing, the knife 48 is in what may be termed its workpiece clearing position, as indicated in FIG. 6, preparatory for the shearing operation of the workpiece in passage of the knife 41 over the knife 48 which takes place upon movement of the roller 61 into the straighter portion of the channel 66. Then again, upon reaching the end limit of travel of the cutter unit to the left, the roller 61 again moves upwardly to clear the workpiece and allow the workpiece to continue its passage through the machine as the knife 48 is returned to its initial starting position; whereupon, the knife 48 is again lowered, preparatory to the next shearing operation.

Apparatus of the type and kind under consideration can be utilized in conjunction with shearing or fashioning continuously fed workpieces of any type or kind, where the unit for performing the desired operation upon the workpiece is moved in synchronism with the feed of the workpiece at and during the shearing operation and, thereafter, as and when the rotary tool or knife is utilized in further advancing the end product through the apparatus.

Heretofore, reference has been made to a knife or tool operating unit and, for purposes of description, this unit is identified by the reference character 68 in FIG. 1 of the drawing and comprises the shaft or elongated tube 18 and the various parts coupled therewith, namely 23, 38, 41, the frame 46 and the blade 48 coupled therewith.

Having fully described my invention, what I claim as new and desire to secure by Letter Patent is:

1. An apparatus of the class described, comprising a casing, a drive shaft supported in spaced bearings in said casing, a tool operating unit mounted on said shaft, said unit comprising a tube extending longitudinally of said shaft, means at one end of the unit for supporting tool means operatively engaging a workpiece arranged longitudinally of the axis of said shaft in spaced relation thereto, said tool means comprising tools extending laterally of said supporting means in cutting relationship, means on the shaft operatively engaging the tube of said unit for rotating said unit and one tool supported thereby, means engaging one end portion of the tube for reciprocating the tube of said unit longitudinally of the shaft while said unit is rotated by the shaft, the tool rotatable with said unit including means engaging a formed end product in feed of said end product longitudinally of said shaft, and a second tool yieldably engaging the rotatable tool.

2. An apparatus as defined in claim 1, wherein means is employed for intermittently moving the rotatable tool toward and from the path of said workpiece.

3. An apparatus of the class described, comprising a casing, a drive shaft supported in spaced bearings in said casing, a tool operating unit mounted on said shaft, said unit comprising a tube extending longitudinally of said shaft, means at one end of the unit for supporting tool means operatively engaging a workpiece arranged longitudinally of the axis of said shaft in spaced relation thereto, said tool means comprising tools extending laterally of said supporting means in cutting relationship, means on the shaft operatively engaging the tube of said unit for rotating said unit and one tool supported thereby, means engaging one end portion of the tube for reciprocating the tube of said unit longitudinally of the shaft while said unit is rotated by the shaft, a sleeve adjustably supported on one end portion of said tube, means detachably coupling the first named tool with said sleeve, another sleeve partially arranged within the first named sleeve, an antifriction bearing between said sleeves, said second named sleeve supporting a frame, a second tool supported in said frame, and means operatively engaging one end portion of the frame for intermittently moving the last named tool relatively to the workpiece in reciprocating movement of said unit.

4. An apparatus as defined in claim 3, wherein means is employed for yieldably supporting the last named tool in engagement with the first named tool.

5. An apparatus of the class described, comprising a casing, a drive shaft supported in spaced bearings in said casing, a tool operating unit mounted on said shaft, said unit comprising a tube extending longitudinally of said shaft, means at one end of the unit for supporting tool means operatively engaging a workpiece arranged longitudinally of the axis of said shaft in spaced relation thereto, said tool means comprising tools extending laterally of said supporting means in cutting relationship, means on the shaft operatively engaging the tube of said unit for rotating said unit and one tool supported thereby, means engaging one end portion of the tube for reciprocating the tube of said unit longitudinally of the shaft while said unit is rotated by the shaft, and the tool rotatable with said unit including means engaging a formed end product in feed of said end product longitudinally of said shaft.

References Cited in the file of this patent

UNITED STATES PATENTS

| | | |
|---|---|---|
| 1,295,359 | Olson | Feb. 25, 1919 |
| 1,297,203 | McGunigal | Mar. 11, 1919 |
| 1,455,232 | Speer | May 15, 1923 |
| 1,648,829 | Sessions | Nov. 8, 1927 |
| 1,975,487 | Topping | Oct. 2, 1934 |
| 2,336,957 | Pierce | Dec. 14, 1943 |
| 2,454,241 | Wennerberg | Nov. 16, 1948 |
| 2,615,517 | Di Cicco | Oct. 28, 1952 |